United States Patent [19]

Shima et al.

[11] Patent Number: 4,899,517
[45] Date of Patent: Feb. 13, 1990

[54] STORAGE, TRANSPORTATION METHOD, PACKAGING MATERIAL, AND PACKAGE FOR AGRICULTURAL PRODUCTS

[75] Inventors: Yoshisuke Shima, Tokyo; Kunihiro Shibazaki, Shiki; Yoshiyuki Konishi, Nagoya; Toshiro Ryuno, Nagoya; Mitsunobu Fujita, Nagoya; Hisaji Yoshida, Ohmuta, all of Japan

[73] Assignees: Mitsui Toatsu Chemicals, Inc.; Kyokujitsu Co., Ltd.; Koike Chemical Co., Ltd., all of Tokyo, Japan

[21] Appl. No.: 105,722

[22] Filed: Oct. 7, 1987

[30] Foreign Application Priority Data

| Oct. 13, 1986 | [JP] | Japan | 61-156560[U] |
| Nov. 27, 1986 | [JP] | Japan | 61-283990[U] |
| Nov. 27, 1986 | [JP] | Japan | 61-183223 |
| Jun. 24, 1987 | [JP] | Japan | 62-096883[U] |
| Jul. 21, 1987 | [JP] | Japan | 62-181547 |

[51] Int. Cl.$^4$ ............................................. B65B 31/00
[52] U.S. Cl. ........................................ 53/432; 53/400; 53/403; 53/510
[58] Field of Search ........... 53/432, 510, 403, 400, 53/401, 434, 512; 426/316, 419

[56] References Cited

U.S. PATENT DOCUMENTS

| 3,396,762 | 8/1968 | Paton | 53/432 X |
| 3,561,982 | 2/1971 | Oeth | 53/510 X |
| 3,773,527 | 11/1973 | Ruggerone | 426/316 X |
| 4,366,179 | 12/1982 | Nawata et al. | 426/419 X |
| 4,409,252 | 10/1983 | Buschkens et al. | 53/432 X |
| 4,535,586 | 8/1985 | Eberle | 426/419 X |

FOREIGN PATENT DOCUMENTS

| 0164285 | 12/1985 | European Pat. Off. |
| 1955313 | 5/1971 | Fed. Rep. of Germany |
| 2585677 | 2/1987 | France |

OTHER PUBLICATIONS

*Modern Plastics International*, vol. 10, No. 6, pp. 38-40, "Opportunities in oriented nitrile resin containers", Jun., 1980.

*Primary Examiner*—James F. Coan
*Attorney, Agent, or Firm*—Oblon, Spivak, McClelland, Maier & Neustadt

[57] ABSTRACT

A hermetically sealed package wherein the inside of a container having shape-retentive capability is formed from a gas barrier plastic material into which an agricultural product such as rice is filled and sealed together with an inert gas provides an efficient storage and transportation system. Once the product is sealed in this package, it is handled in an integral manner from the packaging area to storage through the distribution channels to the final consumption site. A container formed from a high nitrile resin is suitable for applying the system. Shape-retention characteristics is achieved by using a container formed from a gas barrier plastic material packed with an excess of an inert gas, with the amount of the inert gas adsorbed by the agricultural product taken into consideration, or by using a container made of a gas-barrier plastic material, with a smaller part of the wall being made of a film portion which is thinner than the remaining larger portion of the wall.

17 Claims, 3 Drawing Sheets

STORAGE, TRANSPORTATION METHOD, PACKAGING MATERIAL, AND PACKAGE FOR AGRICULTURAL PRODUCTS

BACKGROUND OF THE INVENTION

The present invention relates to a storage and transportation system suitable for agricultural products including grains such as rice and wheat, or toasted materials such as black tea, for which a high degree of freshness and preservation of flavor are required.

The present invention also relates to a packaging material, packaging container, and package used in the storage and transportation of agricultural products such as rice.

In the long period storage of grains, including white rice, wheat, barley, oats, and rye, corn or varieties of beans, and toasted materials such as treated tea leaves and roasted coffee beans, there are many problems such as deterioration of freshness by oxidation, the loss of their taste and flavor, and decline of their quality by the generation of fungi.

Normally, grains are packed in sacks such as hemp sacks, paper sacks, and plastic film bags. However, with these forms of packaging, the above-mentioned quality problems cannot be adequately prevented.

There are commonly known a method for large volume warehouse storage, the so-called Controlled Atmosphere Storage (CAS), in which freshness is preserved by storage under gases for which the composition, temperature, and humidity are controlled therein, and vacuum storage methods in which a high degree of vacuum is provided therein. However, with these methods, the warehouse becomes large-scale, and the costs go up proportionally, and after the products are taken out of the warehouse and enter the distribution or consumers consumption, the decrease in freshness and quality cannot be prevented.

In addition, it has been proposed that for long distance transportation, the storage room be divided into small scale compartments, and the condition of preservation in each compartment be individually controlled. However, in this case, the preservation and transportation equipment becomes large-scale and after the products are taken out of the storage room, the decrease in its quality cannot be prevented.

On the other hand, in usual packaging, large-sized metal containers and drums has been used. These are very costly, and additionally a non-returnable system cannot be adopted. Because these containers and drums are not transparent, their contents cannot be seen, and the effect from the standpoint of design and appearance cannot be obtained.

In the case of rice which is a representative grain, in the final distribution process and in the stores, this grain is packed in bags of polyethylene film or paper and is sold. In particular, in the case of the bags of polyethylene film, small apertures are made for preventing bursting of the bags, and to provide airing of the bags during storage. Accordingly, in any case, the problem arises that when rice is stored for a long period, its taste and flavor are lost, and it attains an odd smell. In order to provide good storage characteristics, consideration has been given to the use of aluminum deposited film, but this causes an increase in costs and because the film has a fairly thick aluminum layer, there is the inconvenience that the contents in the bag are invisible. Also, such bags are mostly soft, so their decorativeness in the store is destroyed.

There is known a close contact dormancy packaging method in which the rice, which has the property of adsorbing large quantities of carbon dioxide under a high concentrations of the gas, is placed in a bag made of a film which has very poor permeability for carbon dioxide (for example, a lamination of simultaneous biaxially-oriented nylon film and polyethylene film), rice is packaged after the atmosphere is displaced with high purity carbon dioxide gas, and then the bag is sealed. With the close contact dormancy packaging method, in a short period after sealing the package, the rice is flowable, and after a period, the bag is drawn to the inside, and rugged surface configurations on the packaging bag appear. Specifically, close contact dormancy packaging presents the same type of appearance as with the conventional vacuum packaging, and the flowing of the rice is prevented and it becomes hard clumps of hermetically sealed bags.

In this way, when the outer surface of the bag takes on a creased surface appearance, it is not possible to arrive at an effective design to take advantage of the transparency of the package. In addition, if there is some printing on the bag surface, a highly effective display is not possible, and an effective display in the stores is not obtainable. Also, when handling during transportation, storage, and display, some small cracks are formed in the rugged portion and there is some concern that the hermetical seal might be broken.

SUMMARY OF THE INVENTION

It is therefore an object of the present invention to provide a superior systematized storage and transportation method for preventing deterioration of freshness and quality of agricultural products such as grains.

Another object of the present invention is to provide a superior, inexpensive packaging material, container, and package for agricultural products, suitable for the use in a non-returnable package delivery method, and, all of which prevent deterioration of the freshness and quality of agricultural products such as grains, and also provide an effective display.

The first object of the present invention is achieved by the discovery of a hermetically sealed package wherein the inside of a shape retaining container is formed from a gas barrier plastic material, into which the agricultural product is filled and hermetically sealed together with an inert gas. Once the agricultural product such as rice is hermetically sealed in this package, it is handled in an integral manner from the packaging area to storage through the distribution channels to the final consumption site. The need for large-scale storage facilities and expensive containers is eliminated, while the loss of freshness and quality of the agricultural product is effectively prevented. Handling is easily carried out, and there is possibility of adoption of a non-returnable container to provide an efficient storage and transportation system.

The inventors of the present invention have discovered that the storage and display effect can be improved through the use of high nitrile resin as the packaging material, or by filling the agricultural product into containers formed from a sheet of that resin.

Also, as a result of searches on the shape of the packaging container and filling method, it has been found that the dual effect of good storage characteristics and display effect can be obtained by filling an excess of an inert gas into a container made of a plastic material having gas barrier properties for storing agricultural products, with the quantity of the inert gas which could be adsorbed by the agricultural products estimated, in such a manner that the original shape of the container is not impaired.

Further, it has been discovered that both effective storage and display characteristics can be obtained by forming one part of the wall of the shape retaining container formed from a gas barrier plastic material with a film thinner than the rest of the container wall (the major portion), and filling the agricultural product into this hermetically sealed container together with the inert gas.

DETAILED DESCRIPTION OF THE PREFERRED EMBODIMENTS

Figure 1:
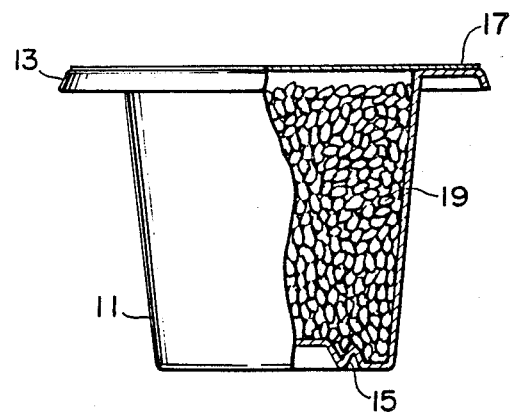
FIG. 1 is a partly sectional view of an example of a container according to the present invention.

In the storage and transportation method of the present invention, the preparation of the hermetically sealed package is performed at the harvest site of agricultural products such as rice, at the rice cleaning facilities in the case of rice, or at the loading location of the transportation terminal. Thereafter, the hermetically sealed packages are transported right up to the final consumption site or processing site, without being opened in the tight-sealed form, so that the agricultural products such as the rice can be transported or stored with its freshness fully maintained, without any necessity for particular transportation and preservation facilities such as refrigerating facilities. Also, because a plastic material is used, it is low priced, and suitable for use with non-returnable containers.

As such plastic material, it is preferable to provide a plastic material which is superior in gas barrier properties, rigidity, workability, and air tightness when sealed, and transparency.

Examples of such plastic materials are a high nitrile resin having a high content of a nitrile component, and a multi-layered sheet comprising a gas barrier film made of (i) a gas barrier resin such as nylon, polyvinyl alcohol, ethylene - vinyl alcohol copolymer, polyvinylidene chloride and high nitrile resin, and (ii) a sheet of another resin such as polyethylene and polypropylene.

The container for use in the present invention has good characteristics of shape retention. The container can have an external shape which is a cylindrical tube, a square tube, or box-shaped.

The agricultural products filled into the container should be materials which can easily lose the taste and flavor. Agriculture products which can be included in this category are, for example, grains, including rices such as white rice, wheat, barley, oats, and rye, beans such as soybeans or red beans, and corn, and toasted materials such as roasted coffee beans, black tea leaves, green tea leaves and flavory tea leaves.

Any of these agricultural products are filled into the container along with an inert gas. Inert gases which are suitable for this application are carbon dioxide gas, nitrogen gas or mixtures of these gases. Filling an inert gas together with the product prevents flavor loss through oxidation and generation of bacteria, mold and insects. It is preferable that a deoxidant such as fine iron powder, sodium sulfate powder be additionally employed for removing oxygen remaining in the container. The same effect can also be obtained when air and such deoxidants are employed at the same time instead of using nitrogen gas. Carbon dioxide is especially desirable because it exhibits dormancy-forming and bacteriostatic characteristics.

The size of the package used in this storage/transportation system depends on the objective of the application. Any suitable size can be used, but taking all things into consideration with respect to the efficiency of the transportation system, including the strength of the container, cost of transportation, and convenience in handling, the 10 to 50 Kg is preferable, and the 20 to 40 Kg is more preferable. Also, the sales unit at the final consumption site and the unit used in the household should be considered, so that a smaller unit, for example, less than 10 Kg could also be more suitable.

Any of the above-mentioned plastic materials can be used for the package. Of these plastic materials, the high nitrile resin is most preferable for packaging agricultural products such as rice since it possesses gas barrier characteristics, transparency, and suitable strength, making it suitable as a packaging material for rice.

High nitrile resins preferably used in the present invention for the packaging material and the container material are copolymers comprising mainly unsaturated nitrile components such as acrylonitrile and methacrylonitrile, and other monomers such as styrene, butadiene, isoprene, methyl acrylate, ethyl acrylate, methyl methacrylate and ethyl methacrylate, with the content of the unsaturated nitrile being 50 wt.% or more. One or more of these monomers can be polymerized with an unsaturated nitrile such as acrylonitrile.

In addition, the high nitrile resins may be used in combination with a rubber-type polymer such as butadiene-acrylonitrile copolymer, isoprene-acrylonitrile copolymer, butadiene-styrene copolymer, polybutadiene, and polyisoprene. The high nitrile resin may be obtained by graft polymerization of the unsaturated components and the above-mentioned monomers in the presence of these rubber-type polymers.

As such high nitrile resins, Barex (made by Sohio Chemicals Co., Ltd.) and Panex (made by Kanegafuchi Chemical Industry Co., Ltd.) are commercially available. A sheet-shaped Barex is commercially available under the trade mark of Zexlon from Mitsui Toatsu Chemicals, Inc. Barex is an acrylonitrile thermoplastic resin which is excellent in gas barrier property, rigidity, transparency, and processability (for example, in deep-draw processing), so that there are no difficulties in forming the container. In addition, this material exhibits superior adhesion property, so that, after the filling, the hermetic sealing of the container is easily performed by heat sealing.

When the high nitrile resin is employed for the packaging material of the present invention, the packing material can be obtained in sheet form by normal extrusion, calendering, and inflation molding processes. The thickness of the sheet is not restricted, but 100 μm to 5000 μm is preferable. Also, the packaging container is prepared by forming the high nitrile resin into a sheet by the vacuum molding or by the pressure molding, or by the direct injection molding.

Further, it is possible to use this material for bag packaging in the same way as conventional packaging by normal heat sealing of a multi-layered film laminated from the above-mentioned single films or laminated from the above-mentioned single films and films of polypropylene, polyethylene, polyester, nylon and the like. Also, it is possible to print on the surface.

It is possible for the container cross-section to take various forms such as a circle, triangle, square forms, etc.

The wall thickness of the container varies according to the amount of the contents, the required strength, etc., but usually about 100 to 800 μm is desirable. The strength of a container with a wall thickness of less than 100 μm may be inadequate. On the contrary, a thickness exceeding 800 μm may be acceptable, but the workability is unsatisfactory and the cost is increased.

A lid or a top film of the container can be made of a film with high gas barrier properties such as a single layer of the above-mentioned high nitrile resin or vinylidene chloride resin, or a multi-layer film comprising a film made of a resin such as polypropylene, polyethylene, and nylon, which is overlaid on the above-mentioned single layer. Aluminum and steel can also be used for such lid or the top film.

FIG. 1 is a sectional view of an example of a container of this type according to the present invention. A quantity of agricultural products such as grains 19 is stored in a container body 11 made from a high nitrile resin sheet. On the top of the container body 11, a top film 17 is sealed to a flange section 13 formed on the container body 11. Further, a rib 15 is provided on the container body 11 with the effect of increasing the strength, or to improve the design.

Dried grains such as rice and wheat have the property of adsorbing inert gases, especially carbon dioxide gas, and after filling to the conventionally used containers, the inside pressure is lowered and the walls of the hermetically sealed container are pulled towards inside, so that the external shape of the container is distorted. When the container is distorted, the outside appearance is impaired and cracks appear in the container walls, which cause a break in the seal.

In addition, when the container becomes indented, the surrounding area is weakened, and cracks appear because of the use of handling and loading equipment during the storage and transportation. In the worst case, the hermetic seal is broken. Even if the hermetic seal structure does not break, when the container becomes rugged, the display effect is reduced.

To prevent this type of problem from occurring, the container may essentially maintain its original condition even after the packed agricultural product has absorbed the filled gas. That is, it is necessary that the container have shape retention characteristics. This may be attained by increasing the strength of the container, in other words, by using a thick plastic sheet or applying a firm heat seal, or by strictly controlling the amount of the inert gas filled. However, this results in an increase in production costs. For example, shape retention characteristics can be provided comparatively simply by the following systems:

(1) The inert gas is filled into the container, taking into consideration the amount of gas which may be adsorbed in the packed grains, such as rice. After the gas is adsorbed, the inside of the container is maintained at a suitable pressure so that the container is not distorted.

(2) Only on one side of the container, for example, is placed a gas barrier plastic film, which seals the opening after the filling of grain, the film being thinner than the other side of the container. When the inside pressure decreases because of the adsorption of gas, this thin film is drawn into the inside and the shape of the container itself essentially does not become distorted.

(3) Grains such as rice are introduced to completely fill the container. The inert gas which exists in the space between the grains is adsorbed and the internal pressure drops. However, the container retains its shape and does become distorted or rugged. If necessary, a comparatively thick-walled container is selected.

Figure 2:
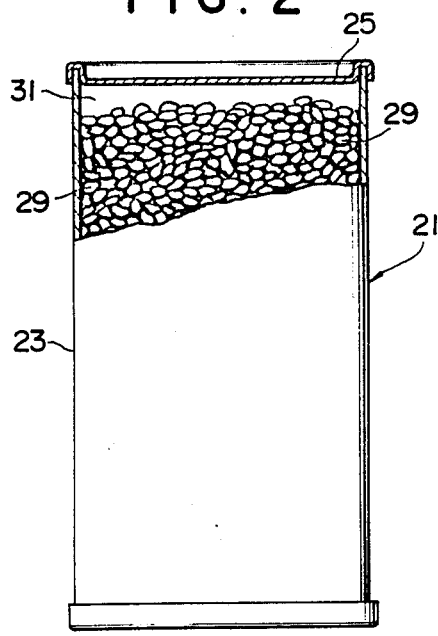
FIG. 2 is a partly sectional view of an example of a package according to the present invention.

FIG. 2 is a partial sectional view of the form of a container which has adopted the system (1) above. A package 21 in which the rice is stored is formed from a plastic sheet with high gas barrier properties. The package 21 is formed from a container body 23 which is cylindrical or has a square cross section, a top cover 25 which seals an opening in the bottom of the container. In addition, as shown in FIG. 1, the container body 23 and the bottom plate 27 may also be integrally formed. The previously mentioned high nitrile resin may easily be processed into this kind of form because it has superior deep-drawing processing characteristics. Thus it is preferable to adopt such molding method. The top cover 25 may be produced in advance to provide a pull top sealing means.

In the package 21 after a predetermined amount of rice 29 has been stored, and after the air has been removed by means of a gas replacement method, high purity carbon dioxide gas, nitrogen gas used for food, or a mixture of carbon dioxide gas and nitrogen gas is filled under a predetermined pressure and sealed by means of the top cover 25.

The volume of rice 29 stored in the container 21 and the filled volume of charging gas comprising carbon dioxide gas are determined so that the freshness and quality of the rice 29 can be properly maintained. However, even after filling with the charging gas, it is desirable that the gas be pressure-filled under the required pressure, which should be maintained to the degree that the package itself is able to maintain the original external shape when the rice 29 was filled.

In addition, to maintain the shape in this way, a certain vacant space 31 remains with respect to the amount of the rice 29 stored in the package 21, and it is desirable to utilize this space as the filling station of the charging gas.

Figure 3:
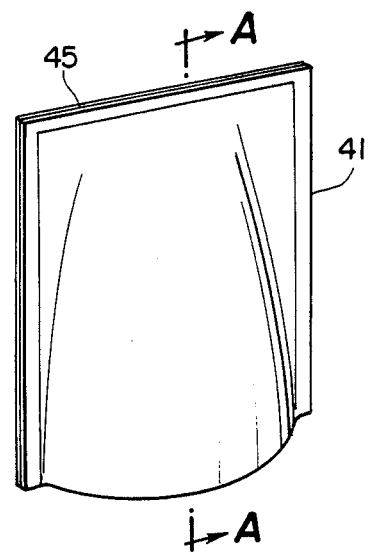
FIG. 3 is an external view of another example of a package according to the present invention.
Figure 4:
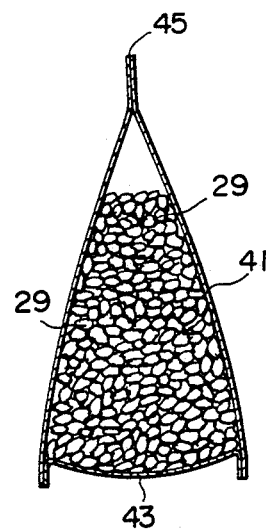
FIG. 4 is a partly sectional view taken on line A—A in FIG. 3.

FIGS. 3 and 4 show another example of a package according to the present invention. A package 41 is fabricated in a bag form which can be filled through a lower section 43 which has a predetermined area formed at the time the rice 29 is stored. The opening is closed by a seal section 45 by heat sealing.

Figure 5:
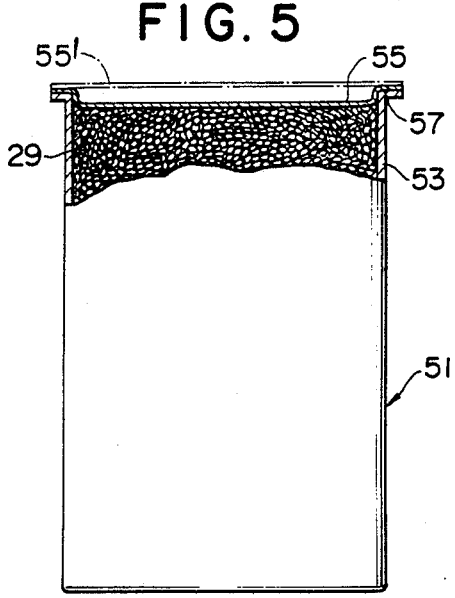
FIG. 5 and FIG. 6 are partly sectional views of parts of further examples of a container according to the present invention.

FIG. 5 is a partial sectional view of further examples of a package according to the present invention. A container wall 53 of a container body 51 in the shape of a square envelope is formed from a comparatively thick plastic sheet which has the gas barrier property and shape retention characteristics. A quantity of rice 29 is stored within this package, it is charged with carbon dioxide gas, a thin film 55 is heat sealed, and the package becomes a hermetically sealed structure. At the time the hermetic sealing occurs from heat sealing, as shown by the chain line in FIG. 5, the thin film 55' is applied, in either perfectly straight or slightly loose form. The plastic container 51 is formed with a thicker plastic sheet than the cover film 55. A heat sealed section 57 is shown.

As time passes the carbon dioxide gas is adsorbed by the rice 29, when the pressure inside the container drops, the thin film 55 is drawn to the inside and the package takes the form as shown in the FIG. 5. At this time, the container body 53, which is formed from a relatively thick plastic sheet, maintains its original shape because the drop in the inner pressure is compensated for by the collapse of the film 55 which has weakened an opposing strength, so that depending also on the size of the container, even if the container body 53 is made of relatively thick plastic sheet, the original shape of the container can essentially be maintained. Also, in the same way, even in the case where there is some degree of variation in the amount of carbon dioxide gas introduced and the amount adsorbed by the rice, this influence is deducted.

Further, because the empty space within the container is small, damage to this portion is prevented and damage to the hermetically seal is avoided.

The carbon dioxide gas prevents the reduction of freshness caused by oxidation and the propagation of aerobic bacteria, and also provides a dormancy-forming and bacteriostatic effect on rices such as white rice, so that the white rice can be stored under favorable conditions.

The charging of the carbon dioxide gas can be accomplished by commonly known methods, but the use of dry ice is also an excellent method. The required quantity of dry ice can be inserted into the container body 51 to charge the gas. A cooling effect is also obtained.

In the example in FIG. 5, a body is in the shape of a square envelope, but the present invention is not restricted to this shape. For example, shapes such as cylinders, cubes, boxes and the like are also satisfactory. In the case of a cylinder, the bottom surface and/or the top surface is formed from a thin film. In the case of a cube or a box, one or two suitable surfaces, according to the conditions, are formed from a thin film.

Figure 6:
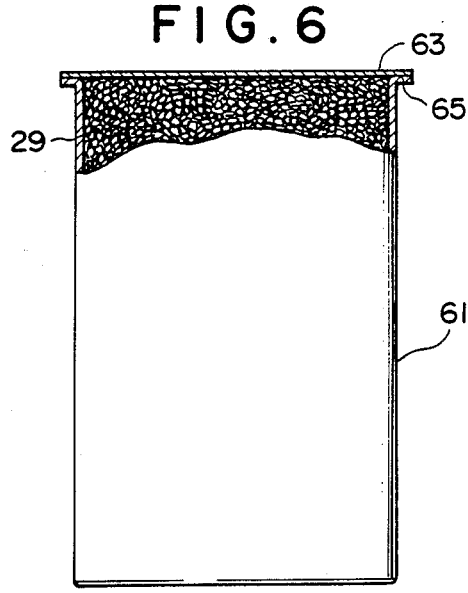

FIG. 6 shows the package used with the above-mentioned system (3). A container 61 is completely filled with an inert gas and a quantity of rice 29. Reference numeral 63 indicated a lid sheet, and 65 indicates a heat seal portion.

For the container as shown in FIGS. 2 to 6, as already explained, plastic with gas barrier properties, preferably high nitrile resin such as Barex is used.

With reference to the following examples, the present invention will now be explained in detail. These examples are given for illustration of the present invention and are not intended to be limiting thereof.

In the following embodiments, the evaluation of "the taste of white rice" and "flavor" was based on the judgement by the five (5) monitors. EXAMPLE 1

By using a high nitrile resin containing about 70 wt.% acrylonitrile by analysis of nitrogen value, obtained by emulsion polymerization of 75 parts by weight of acrylonitrile and 25 parts by weight of methyl methacrylate in the presence of 10 parts by weight of butadiene-acrylonitrile rubber-type copolymer (containing 70 wt.% butadiene), a sheet having a thickness of 500 μm was obtained by extrusion. The thus obtained sheet was subjected to a vacuum forming process to provide a container having a depth of 5 cm with an inside volume of 500 ml.

The container was filled with 400 g of white rice and charged with carbon dioxide gas. By using a separately fabricated film made of the above-mentioned high nitrile resin having a thickness of 40 μm, the container was subjected to heat sealing. After six (6) months the same taste of white rice was still the same and there was no odd smell present at all.

EXAMPLE 2

Example 1 was repeated except that the high nitrile resin employed in Example 1 was replaced by the high nitrile resin prepared as follows, whereby a container according to the present invention was prepared.

A high nitrile resin containing about 65 wt.% of acrylonitrile (by the analysis of the contained nitrogen) was prepared by polymerization of 70 parts by weight of acrylonitrile, 15 parts by weight of methyl methacrylate, and 5 parts by weight of styrene, in the presence of 10 parts by weight of butadiene acrylonitrile rubber-like copolymer. A check was made for the taste of the white rice and the presence of flavor in the same manner as in Example 1. After six (6) months, the taste of the white rice was still the same and there was no odd smell present.

EXAMPLE 3

Through the blow molding process and by using the same resin as with Example 1, a container having an average wall thickness of 500 μm with the inside volume of 500 ml was prepared, and the same processings as given in Example 1 were repeated. Even after six (6) months, the taste of the white rice was still retained and there was no odd smell.

EXAMPLE 4

The same resin as with Example 1 was used, and by the injection molding a container of an internal volume 500 ml and with an average wall thickness of 500 μm was prepared, with the repetitions of the processes given in Example 1 except for the replacement of the carbon dioxide with a mixture gas of carbon dioxide gas/nitrogen gas (1 : 1). Even after six (6) months, the taste of the white rice was still retained and there was no odd smell.

COMPARATIVE EXAMPLE 1

Example 1 was repeated except that polyethylene was used as the resin, whereby a container was prepared. The container was subjected to the same tests as in Example 1. The result was that the container form was broken down from lack of strength, and in addition, after six (6) months the taste of the white rice was deleteriously affected and an odd smell was present.

EXAMPLE 5

250 g of black tea leaves was filled instead of rice into the container as prepared in Example 1, filled with a nitrogen gas, and was heat sealed by a 100 μm thick high nitrile resin sheet as separately prepared, which was then preserved for six (6) months under a temperature of 35° C. with 90% RH. Thereafter the container was opened and no change in flavor and taste, nor odd smell, was observed.

On the other hand, for comparison, the conventionally marketed package of black tea leaves (made of polyethylene film) was preserved for six (6) months under 35° C. and with 90% RH and it was found that the flavor and taste deteriorated.

EXAMPLE 6

300 g of soybeans was filled instead of the rice into the container as prepared in Example 1, filled with a nitrogen gas, and was heat sealed by a 100 μm thick high nitrile resin sheet as prepared separately, which was preserved for six (6) months under 35° C. with 90% RH. The soya beans had no change at all.

On the other hand, for comparison, soya beans were packaged into a nitrogen-gas substituted polyethylene film bag having a thickness of 50 μm, and was preserved for six (6) months under 35° C. and with 90% RH. In part of the soybeans, blackened portions were found.

What is claimed is:

1. A storage and transportation method for agricultural products comprising the steps of:
   filling agricultural products into a package having shape retention capability made of a gas-barrier plastic material, together with an inert gas,
   tightly sealing said package, and
   storing and transporting said tightly sealed package in a tightly sealed state,
   wherein said package has a smaller part of its walls made of a film portion which is thinner than the remaining larger portion of its walls, said film portion capable of being drawn towards the inside of said package when the inner pressure of said package is decreased as said inert gas is adsorbed by said agricultural products, wherein said plastic material is a high nitrile resin comprising a copolymer of (i) an unsaturated nitrile component in an amount of 50 wt.% or more, and (ii) a monomer component which is capable of being copolymerized with said unsaturated nitrile component.

2. A package for agricultural products comprising a container with a particular shape formed from a gas barrier plastic material, in which an agricultural product is tightly sealed, together with an excess of an inert gas, with the amount of said inert gas adsorbed by said agricultural product taken into consideration, in such a manner that said particular shape of said container is not substantially changed due to the decrease of the inner pressure of said container caused by the adsorption of said inert gas by said agricultural products, wherein said plastic material is a high nitrile resin comprising a copolymer of (i) an unsaturated nitrile component in an amount of 50 wt.% or more, and (ii) a monomer component which is capable of being copolymerized with said unsaturated nitrile component.

3. The package for agricultural products as claimed in claim 2, wherein said inert gas is selected from the group consisting of a nitrogen gas, a carbon dioxide gas and a mixture thereof.

4. The package for agricultural products as claimed in claim 2, wherein said high nitrile resin is a copolymer obtained by copolymerizing (i) acrylonitrile and (ii) a monomer component which is capable of being copolymerized with said acrylonitrile in presence of a conjugated diene synthetic rubber.

5. The package for agricultural products as claimed in claim 4, wherein said conjugated diene synthetic rubber is selected from the group consisting of butadiene-acrylonitrile copolymer, isoprene acrylonitrile copolymer, butadiene - styrene copolymer, polybutadiene and polyisoprene.

6. The package for agricultural products as claimed in claim 2, wherein said unsaturated nitrile component is selected from the group consisting of acrylonitrile and methacrylonitrile, and said monomer component is selected from the group consisting of styrene, butadiene, isobutylene, methylacrylate, ethylacrylate, methylmethacrylate, and ethylmethacrylate.

7. The package for agricultural products as claimed in claim 2, wherein said agricultural product is a grain.

8. The package for agricultural products as claimed in claim 7, wherein said grain is rice.

9. A package comprising a sealed container with the wall thereof made of a gas-barrier plastic material, having shape-retention characteristics, a smaller part of said wall made of a film portion which is thinner than the remaining larger portion of said wall, containing therein an agricultural product, together with an inert gas, said film portion being capable of being drawn towards the inside of said container when the inner pressure of said container is decreased as the said inert gas is adsorbed by said agricultural product, thereby preventing the overall external shape of said container from being distorted, and wherein said plastic material is a high nitrile resin comprising a copolymer of (i) an unsaturated nitrile component in an amount of 50 wt.% or more, and (ii) a monomer component which is capable of being copolymerized with said unsaturated nitrile component.

10. The package as claimed in claim 9, wherein said thin film portion constitutes a lid which is tightly sealed to said container by heat sealing.

11. The package as claimed in claim 9, wherein said inert gas is selected from the group consisting of a nitrogen gas, a carbon dioxide gas and a mixture thereof 12. The package as claimed in claim 9, wherein said high nitrile resin is a copolymer obtained by copolymerizing (i) acrylonitrile and (ii) a monomer component which is capable of being copolymerized with said acrylonitrile in presence of a conjugated diene synthetic rubber.

13. The package for agricultural products as claimed in claim 12, wherein said conjugated diene synthetic rubber is selected from the group consisting of butadiene - acrylonitrile copolymer, isoprene acrylonitrile copolymer, butadiene - styrene copolymer, polybutadiene and polyisoprene.

14. The package for agricultural products as claimed in claim 9, wherein said unsaturated nitrile component is selected from the group consisting of acrylonitrile and methacrylonitrile, and said monomer component is selected from the group consisting of styrene, butadiene, isobutylene, methylacrylate, ethylacrylate, methylmethacrylate, and ethylmethacrylate.

15. The package for agricultural products as claimed in claim 9, wherein said agricultural product is a grain.

16. The package for agricultural products as claimed in claim 15, wherein said grain is rice.

17. A storage and transportation method for agricultural products comprising the steps of:
   filling agricultural products into a package having shape retention capability made of a gas-barrier plastic material, together with an inert gas,
   tightly sealing said package, and storing and transporting said tightly sealed package in a tightly sealed state, wherein said inert gas is used in an excess amount such that, taking into consideration the amount of it being adsorbed by the agricultural products, the particular shape of said package is not substantially changed due to the increase of the inner pressure of said package caused by the adsorption of said inert gas by said agricultural products, wherein said plastic material is a high nitrile resin comprising a copolymer of (i) an unsaturated nitrile component in an amount of 50 wt.% or more, and (ii) a monomer component which is capable of being copolymerized with said unsaturated nitrile component.

* * * * *